United States Patent
Kanskar

(10) Patent No.: US 10,211,591 B2
(45) Date of Patent: Feb. 19, 2019

(54) TANDEM PUMPED FIBER AMPLIFIER

(71) Applicant: NLIGHT, INC., Vancouver, WA (US)

(72) Inventor: Manoj Kanskar, Portland, OR (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 15/782,756

(22) Filed: Oct. 12, 2017

(65) Prior Publication Data
US 2018/0109064 A1    Apr. 19, 2018

Related U.S. Application Data

(60) Provisional application No. 62/408,046, filed on Oct. 13, 2016.

(51) Int. Cl.
*H01S 3/067*     (2006.01)
*G02B 6/24*      (2006.01)
(Continued)

(52) U.S. Cl.
CPC ...... *H01S 3/06758* (2013.01); *G02B 6/02042* (2013.01); *G02B 6/24* (2013.01); *H01S 3/0085* (2013.01); *H01S 3/06729* (2013.01); *H01S 3/06754* (2013.01); *H01S 3/0941* (2013.01); *H01S 3/094042* (2013.01); *H01S 3/2308* (2013.01); *H01S 3/0064* (2013.01); *H01S 3/0672* (2013.01); *H01S 3/0675* (2013.01); *H01S 3/06733* (2013.01); *H01S 3/09408* (2013.01); *H01S 3/09415* (2013.01);
(Continued)

(58) Field of Classification Search
CPC ........... H01S 3/06758; H01S 3/094042; H01S 3/06754; H01S 3/06729; H01S 3/2308; H01S 3/0941; H01S 3/0085; H01S 3/0675; H01S 3/06733; H01S 3/09408; H01S 3/0672; H01S 2301/03; H01S 3/094015; H01S 3/094; G02B 6/24; G02B 6/02042
See application file for complete search history.

(56) References Cited

U.S. PATENT DOCUMENTS

| | | | |
|---|---|---|---|
| 2006/0187973 A1 | 8/2006 | Varnham | |
| 2008/0130102 A1* | 6/2008 | Murison | H01S 3/06754 359/341.3 |
| 2010/0202481 A1 | 8/2010 | Morasse | |

FOREIGN PATENT DOCUMENTS

| AU | 2009200094 | 2/2009 |
|---|---|---|
| CN | 103560382 | 2/2014 |
| WO | 2010083595 | 7/2010 |

OTHER PUBLICATIONS

Hu Xiao et al; "High Power 1018 Nmytterbium-Doped fiber Laser and its Application in Tandem Pump"; Applied Optics, vo. 54, No. 27; Sep. 16, 2015; pp. 8166.

(Continued)

*Primary Examiner* — Dung Nguyen
(74) *Attorney, Agent, or Firm* — Schwabe Williamson & Wyatt, P.C.

(57) ABSTRACT

In an example, a tandem pumped fiber amplifier may include a seed laser, one or more diode pumps, and a plural core fiber including a first core and a second core, the second core surrounding the first core. The plural core fiber may include a first section to operate as an oscillator and a second different section to operate as a power amplifier. The one or more diode pumps may be optically coupled to the first section of the plural core fiber, and the seed laser may be optically coupled to the first core.

20 Claims, 5 Drawing Sheets

(51) Int. Cl.
  H01S 3/00    (2006.01)
  H01S 3/0941  (2006.01)
  H01S 3/23    (2006.01)
  G02B 6/02    (2006.01)
  H01S 3/094   (2006.01)
  H01S 3/16    (2006.01)

(52) U.S. Cl.
  CPC ... *H01S 3/094007* (2013.01); *H01S 3/094015* (2013.01); *H01S 3/1618* (2013.01); *H01S 2301/03* (2013.01)

(56) References Cited

OTHER PUBLICATIONS

Christophe A. Codemard et al.; "Tandem Pumping of Large-Core Double-Clad Ytterbium-Doped Fiber for Control of Excess Gain"; Lasers, Sources and Related Photonic Devices; University of Southampton, UK; copyright 2010 Optical Society of America; 3 pages.

Hao Jin-Ping et al.; "Optical Properties of Ytterbium-Doped Tandem-Pumped Fiber Oscillator"; Chinese Physics, Bristol GB; vol. 23, No. 1; Jan. 28, 2014; p. 14203.

Kiao Hu et al.; "Experimental Study on Tandem Pumped Fiber Amplifier"; Optics and Laser Technology, vol. 44, No. 5; copyright 2012 Elsevier Ltd.; 4 pages.

European Patent Office (EPO, Rijswijk, NL); International Search Report and Written Opinion PCT/US2017/056402 dated Feb. 23, 2018; 18 Pages.

Beier, F. et al; "6.8 kW Peak Power Quasi-Continuous Wave Tandem-pumped Ytterbium Amplifier at 1071nm nm"; Fiber Lasers XII: Technology Systems and Applications; Proc. of SPIE vol. 9344, 93441H (Mar. 4, 2015); 3 pages.

Zhou, Pu et al.; "High-Power Fiber Lasers Based on Tandem Pumping"; Journal Optical Society of America, vol. 34, No. 3; Mar. 2017; 8 pages.

Naderi, Shadi et al.: "Theoretical Analysis of Effect of Pump and Signal Wavelengths on Modal Instabilities in Yb-doped Fiber Amplifiers"; Proc. of SPIE vol. 8964 8964W-1; (Feb. 20, 2014); 7 pages.

\* cited by examiner

TANDEM PUMPED FIBER AMPLIFIER

CROSS REFERENCE TO RELATED APPLICATION

This application claims the benefit of U.S. Provisional Application No. 62/408,046, filed Oct. 13, 2016, which is incorporated herein by reference in its entirety.

TECHNICAL FIELD

The present disclosure relates to fiber amplifiers.

BACKGROUND

High average power fiber lasers with diffraction-limited beams that are suitable for High Energy Laser (HEL) applications are currently primarily limited in output power by Stimulated Brillouin Scattering (SBS) and Modal Instability. Some known systems have been effective to scale power to greater than the 2 kW level by mitigating SBS. However, Model Instability may still bottleneck power-scaling in regular large-mode area (LMA) fiber, e.g., non-photonic-crystal fiber (PCF) and/or photonic bandgap (PBG) fiber. Specifically, Modal Instability may limit diffraction limited output power to a threshold near 2 kW, such as ~2.2 kW for 20 µm core step-index dual-clad fiber laser.

BRIEF DRAWINGS DESCRIPTION

The accompanying drawings, wherein like reference numerals represent like elements, are incorporated in and constitute a part of this specification and, together with the description, explain the advantages and principles of the presently disclosed technology.

Figure 3A:
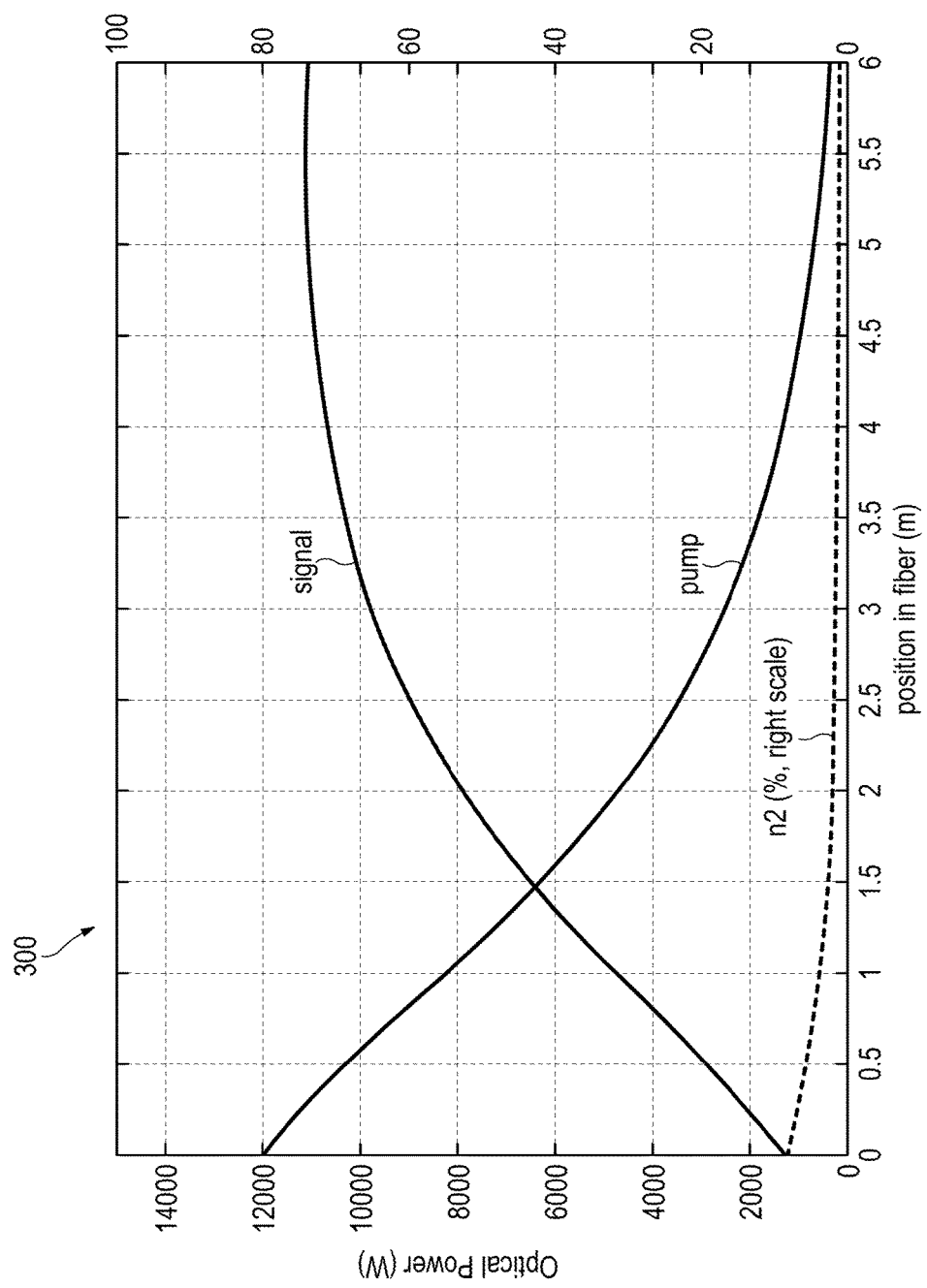
Figure 3B:
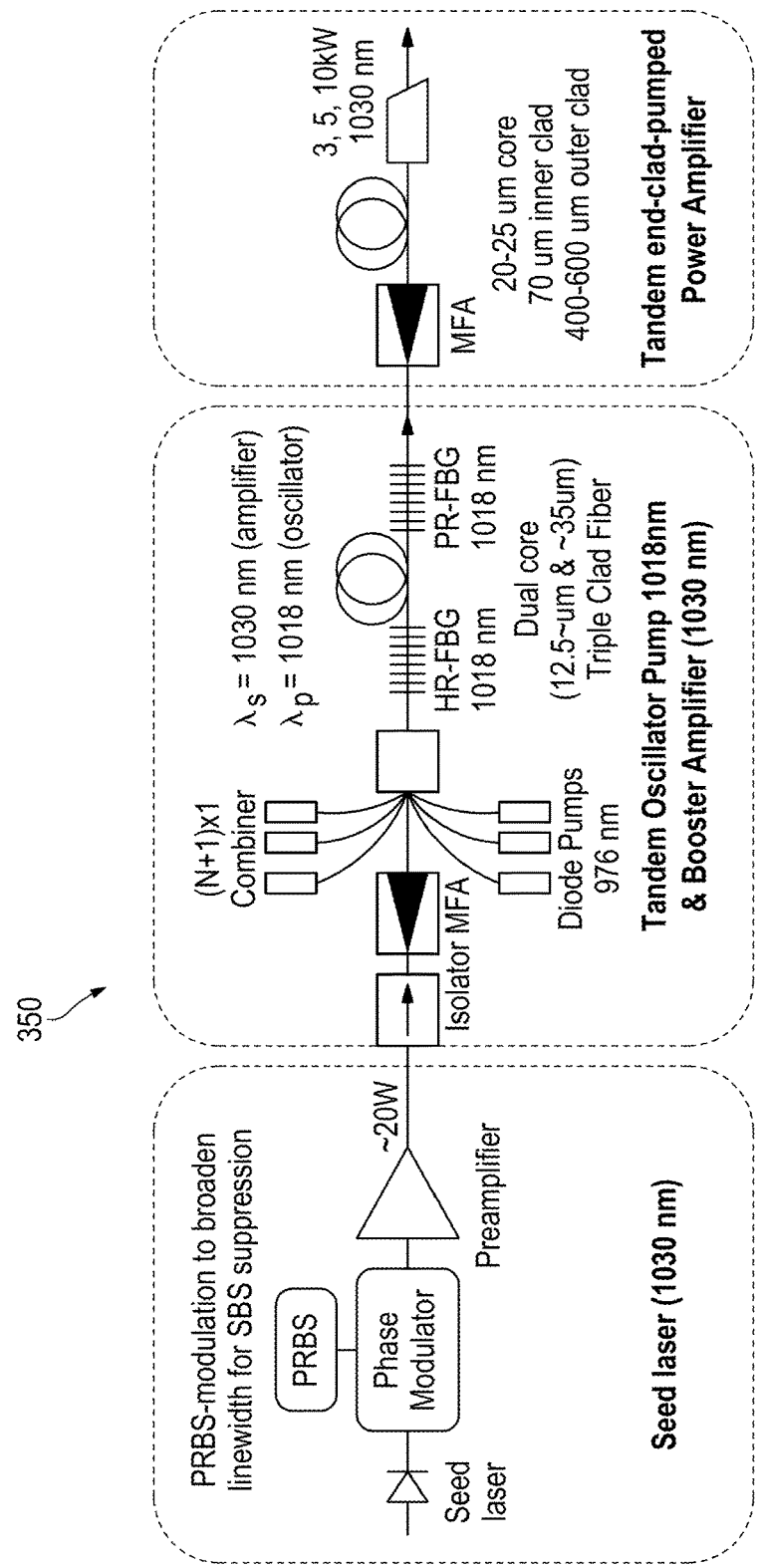
Figure 3C:
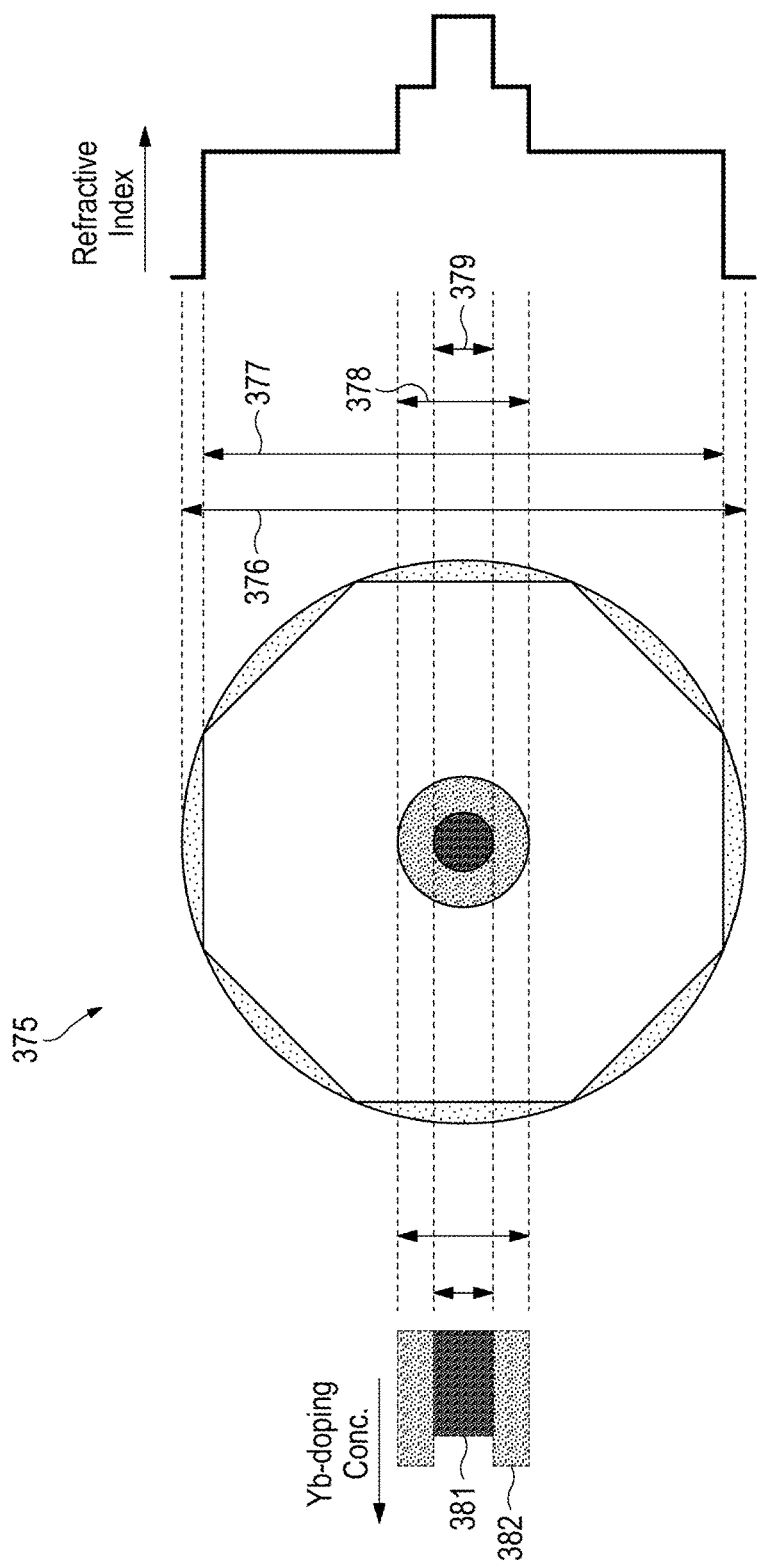

FIGS. 3A-C illustrate, respectively, a graph of calculated signal power and tandem pump power inside a final power amplifier along with upper state population for a tandem pump fiber amplifier, a block diagram of the tandem pump fiber amplifier, and a cross-section view of a dual-core and all-glass-fiber of the tandem pump fiber amplifier.

Figure 4:
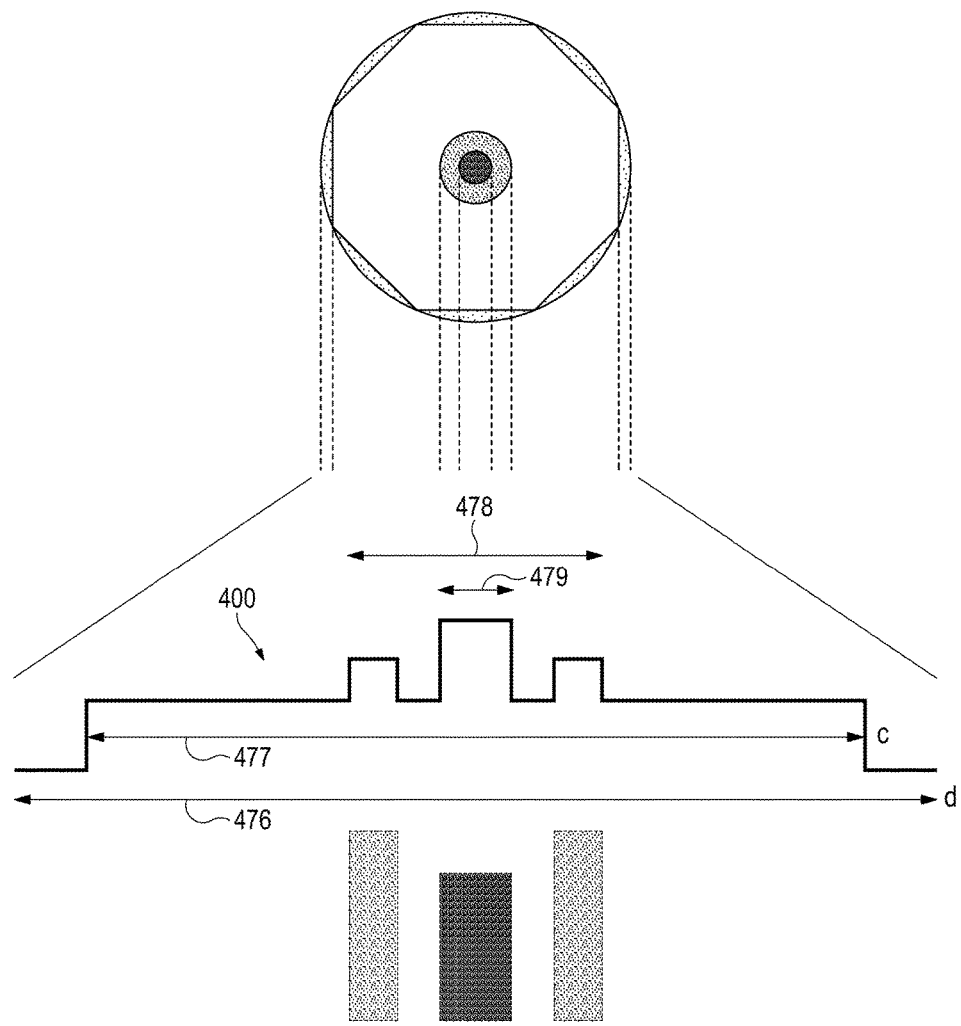

FIG. 4 illustrates a refractive index of a fiber similar to the fiber of FIG. 3C.

DETAILED DESCRIPTION

Some embodiments of a tandem pumped fiber amplifier may include a seed laser, one or more diode pumps, and a plural core fiber including a first core and a second core, the second core surrounding the first core. The plural core fiber may include a first section to operate as an oscillator and a second different section to operate as a power amplifier. The one or more diode pumps may be optically coupled to the first section of the plural core fiber, and the seed laser may be optically coupled to the first core.

The tandem pumped fiber amplifier may be less bulky (e.g., smaller and/or not as heavy) and/or less costly than a system using a 10 kW single mode fiber laser in a regular LMA fiber using numerous 1018 nm single mode tandem fiber lasers as high brightness pump sources. The tandem pumped fiber amplifiers may have lower power requirements and/or lower thermal dissipation requirements than such systems as well.

Whereas a system using a 10 kW single mode fiber laser in a regular LMA fiber using numerous 1018 nm single mode tandem fiber lasers as high brightness pump sources may require a reduction in quantum-defect heating from the usual ~9% in the 976 nm pumped system down to ~4% in the tandem 1018 nm pumped amplifiers to achieve 10 kW, embodiments disclosed herein may not be subject to the same requirement in order to achieve 10 kW or greater. A system employing a tandem pumped fiber amplifier may be compatible with regular LMA fiber technology but scalable from a few kilowatts to 10 kW or more by scaling up the multimode diode laser pump power. As a result, embodiments described herein may simplify manufacturing in high energy laser applications. In a system employing a tandem pumped fiber amplifier, a final amplifier stage may be greater than 1 kW to address Model Instability. A tandem pumped fiber amplifier may push the single channel output power to greater than known thresholds created by Modality Instability, such as 3 kW, 5 kW, 10 kW, or more.

Several advantages of this approach have been identified. First, the quantum defect in the power amplifier may be only 1.5% at 1030 nm when pumped at 1018 nm, in some embodiments. At a nominal wavelength of 1064 nm, this quantum defect is about 4%. Which is less than half compared to pumping at 976 nm (which may be associated with a 84% quantum defect). Secondly, the signal injected into the power amplifier may be significantly greater than 1 kW. Both factors may provide a higher threshold condition for Modal Instability. This may provide greater than 10 kW of spectral beam combining (SBC) and coherent beam combining (CBC) combinable power. The tandem pumped fiber amplifier may use regular LMA fiber technology without compromising the total efficiency of the system. All of this can be achieved by pumping with low SWAP (size, weight and power) and low-cost multimode diode pumps rather than using a multitude of expensive and bulky single mode fiber lasers.

Some embodiments include a plural core fiber in a ~6 meter "effective" fiber length including a Yb-doped core region, an undoped inner clad region, and an outer clad region (e.g., an outer glass-clad). In one embodiment, the dimensions of the doped core region, the undoped inner clad region, and the outer clad region may be 20-25 µm, 70 µm, and 400-600 µm, respectively (pump guide may be 800 µm). The plural core fiber may include a final power amplifier including a mode-field adaptor to match the mode to a power amplifier section of the plural core fiber. A 1018 nm tandem pump may be guided in the inner clad region and may pump the signal in the core.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another.

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Figure 1:
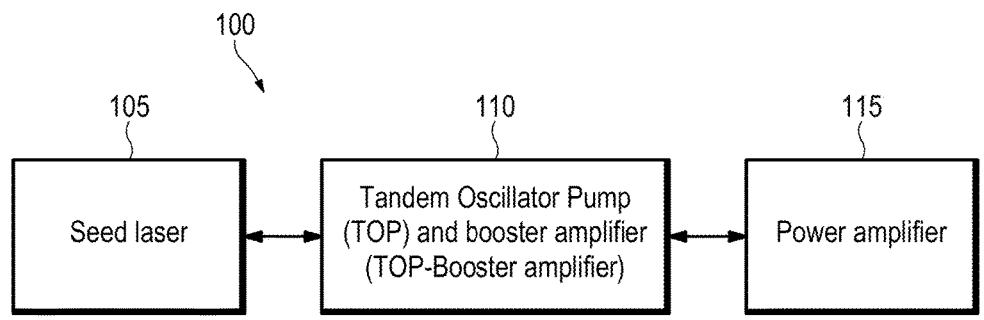
FIG. 1 illustrates a tandem pumped fiber amplifier.

FIG. 1 illustrates a tandem pumped fiber amplifier 100. The tandem pumped fiber amplifier 100 may include a seed laser 105 with a selected center wavelength that may be pseudo random bit sequence (PRBS) phase-modulated to achieve necessary bandwidth to suppress SBS and keep coherence length long enough for SBC and CBC applications. The selected center wavelength may be in the range of 1020-1080 nm for Yb-doped fiber, in some embodiments. The seed laser 105 may include a preamplifier (not shown) to generate sufficient power, e.g., greater than 20 W of seed power for amplification in the subsequent sections.

Fiber of the seed laser 105 may be coupled to (e.g., spliced) with fiber of a tandem oscillator pump and booster amplifier (TOP-booster amplifier) 110, which may be coupled to (e.g., spliced) with fiber of a power amplifier 115. The TOP-booster amplifier 110 may include a first section of a plural core fiber, e.g., a dual core fiber, and at least one set of one or more diode pumps optically coupled, e.g., end-coupled, side-coupled, or the like, or combinations thereof, to the diode pump set.

Figure 2:
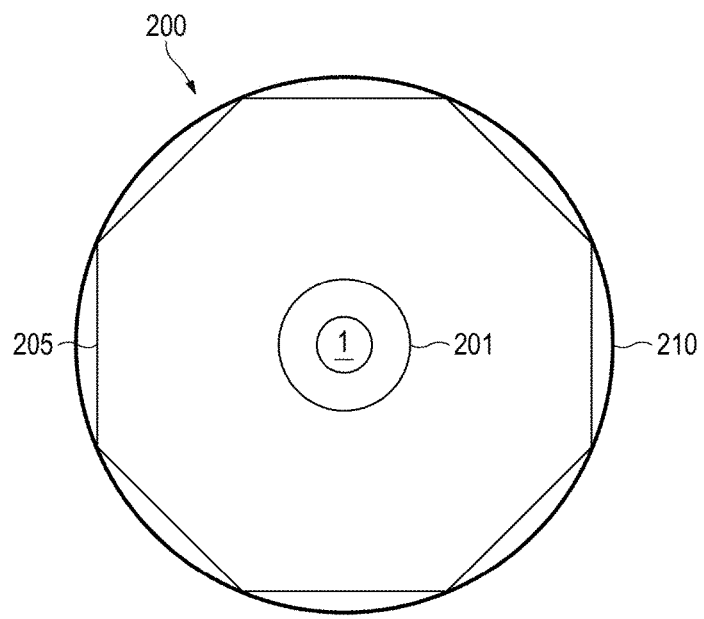
FIG. 2 illustrates a cross-section view of a coaxial dual core fiber that may be utilized in a tandem pumped fiber amplifier, in some embodiments.

Some of the cores of the plural core fiber (e.g., both of the cores of a dual core fiber laser) may be arranged along a same axis or a different axis (e.g., coaxial with the second core symmetrically surrounding the first core or with the second core asymmetrically surrounding the first core). FIG. 2 illustrates a cross-section view of a coaxial-type dual core fiber 200 that may be utilized in the tandem pumped fiber amplifier 100 of FIG. 1, in some embodiments. The fiber 200 includes a first core 1 surrounded by a second core 201.

In some embodiments, the first core 1 may have a first diameter, and the second core 201 may have a second different diameter (e.g., a second larger diameter). In one embodiment, the first diameter may be ~12.5 μm and the second diameter may be ~35 μm.

The first core 1 may be doped differently than the second core 201. In one embodiment, the first core 1 may include a first doping concentration and the second core 201 may include a second doping concentration associated with a higher absorption coefficient. In some embodiments, the first core 1 may include Yb-700 (Yb ~50×10$^{24}$ m$^{-3}$) and the second core 201 may include with Yb-1200 (Yb ~120×10$^{24}$ m$^{-3}$).

In some examples, the first core 1 may have a numerical aperture (NA) that is not greater than an NA of the second core 201. In one embodiment, the first core 1 may have an NA of about 0.05 or less and the second core 201 may have an NA no less than 0.05, e.g., in the range of 0.05-0.10.

The fiber 200 may include a cladding 205 surrounding the cores 1 and 201, and a jacket 210. The cladding 205 may be a glass-clad multimode pump guiding octagonal core with a third diameter that is greater than the second diameter of the second core, e.g., ~800 μm.

Referring again to FIG. 1, the TOP booster-amplifier 110 may include the first section of the plural core fiber. The first section may include a first fiber Bragg grating (FBG) and a second FBG (e.g., an HR (highly reflective) FBG and a PR (partially reflecting) FBG, respectively), which may include diameters corresponding to the second core 201. The first and second FBGs may be centered at a selected wavelength to form a multi-mode oscillator which builds up necessary power for the tandem pump to be used by the power amplifier 115.

The selected wavelength may be less than a center wavelength of the seed laser. A difference may be 3% or less (e.g., 2.3%) in some examples and/or in a range of 0.1-6%. In this range, with a core having sufficient dimensions to suppress Modal Instability, and SBS. The selected wavelength may be 1018 nm, in one embodiment.

In some examples, the doping of the first core 1 may be selected to generate only sufficient single mode seed power while it is bi-chromatically pumped by both the multimode 976 nm pump as well as the 1018 nm tandem pump generated within the second core 201. The oscillator of the first section of the plural core fiber may use both of these doped cores to convert most of the 976 nm multi-mode pump power into 1018 nm wavelength within the 35 μm diameter. Residual unabsorbed 976 nm pump (e.g., several percent) may enter the cladding of the second section of the plural core fiber (e.g., the power amplifier 115) and be utilized, which may optimize overall efficiency (e.g., overall electrical-to-optical power conversion efficiency). An o-o efficiency corresponding to the first section may be 3% more efficient due to lower quantum defect when generating 1018 nm wavelength compared to 1064 nm amplifiers.

FIGS. 3A-C illustrate, respectively, a graph 300 (FIG. 3A) of calculated signal power and tandem pump power inside a final power amplifier along with upper state population for a tandem pump fiber amplifier 350 (FIG. 3B), a block diagram of the tandem pump fiber amplifier 350, and a cross-section view of a dual-core and all-glass-fiber 375 (FIG. 3C) of the tandem pump fiber amplifier 350. Modeling of the tandem pump fiber amplifier 350 has shown an absorption of greater than 0.51 dB (of 976 nm and 1018 nm) and greater than 15 dB (of 976 nm) in the second core. When the longest signal wavelength of 1080 nm at 20 W is launched into a first section of the fiber 375, greater than 1.27 kW of signal may be generated which can be amplified in the second section of the fiber 375.

FIG. 3C shows a refractive index of the first core, the second core, the inner glass clad, as well as relative doping concentration in the cores. In this embodiment, the values 376-379 may be, respectively, 880 μm, 800 μm, 35 μm, and 12.5 μm, and the core region 381 may include a first doping profile of Yb-700 ~50×10$^{24}$ m$^{-3}$ and the core region 382 may include a second different profile of Yb-1200 ~120×10$^{24}$ m⁻³. In other embodiments, the values 376-379 may be, respectively, 880 µm, 800 µm, 35 µm, and 14 µm.

Modeling predicts greater than 83% conversion efficiency for the 976 nm multimode pump into a 1018 nm tandem pump, and power levels of greater than 12.5 kW may be generated in the second core of the fiber 375 given a 10-meter-long oscillator. Results of this simulation are shown in the graph 300.

The seed laser of the tandem pump fiber amplifier 350 may be, for SBC or CBC, a single-mode semiconductor laser such as a distributed feedback (DFB) laser or a non-planar ring oscillator (NPRO) and phase modulated to suppress SBS (for other applications any appropriate single mode seed, e.g., any 20 W single mode seed, may be used). The seed laser may be 1064 nm.

A TOP boost amplifier of the tandem pump fiber amplifier 350 may include a dual core and a plural clad, e.g., dual or triple clad. The inner core may be doped to generate sufficient power at seed wavelength need to enter the power amplifier stage. The outer multimode core may be doped to convert a portion (e.g., most) of the 976 nm diode pump into the 1018 nm tandem pump. The tandem oscillator pump may use HR and PR FBG's to generate a ~10 nm bandwidth multi-mode oscillator using a combination of the inner and outer cores, which may be doped at the same level or differently. HR and PR FBG's may have the same core diameter as the outer multimode core of the TOP-booster gain amplifier. The seed wavelength that is injected into this stage may be amplified by both the 976 nm multimode pump as well as the 1018 nm tandem pump that is generated inside the oscillator cavity, e.g., with different absorption coefficient determined by the rare earth dopant absorption cross section at these wavelengths and the core-to-clad area ratios. The power scaling of this laser may be done by adding more diode pumps as needed to reach target power values, e.g., 3 kW, 5 kW, 10 kW, etc. In some embodiments, the "effective multimode HR-FBG" may be one of the following types:

1. FBG written in Ge-doped fiber with a core diameter equal to 379 (FIG. 3C) or 479 (FIG. 4).
2. FBG written in Ge-doped fiber with a core diameter equal to 379 (FIG. 3C) or 479 (FIG. 4) and spliced to a passive chirally-coupled core fiber of the same core size so as to strip off the higher order modes so that reflectivity of the FBG is greater than 99%.
3. FBG written in grated-index (GRIN) fiber with an "effective core diameter" equal to 379 (FIG. 3C) or 479 (FIG. 4).
4. FBG written in GRIN fiber with an "effective core diameter" equal to 379 (FIG. 3C) or 479 (FIG. 4) and spliced to a passive chirally-coupled fiber of the same core size so as to strip off the higher order modes so that reflectivity of the FBG is greater than 99%.
5. FBG written in a multimode fiber with rings of alternating high-index and low index shells.
6. The seed wavelength that is injected into this stage may be amplified by both the 976 nm multimode pump as well as the 1018 nm tandem pump that is generated inside the oscillator cavity, e.g., with different absorption coefficient determined by the rare earth dopant absorption cross section at these wavelengths and the core-to-clad area ratios. The power scaling of this laser may be done by adding more diode pumps as needed to reach target power values, e.g., 3 kW, 5 kW, 10 kW, etc.

The final power amplifier of the tandem pump fiber amplifier 350 may use all of the 1018 nm tandem pump in the inner cladding and a portion (e.g., all) any residual 976 nm light not absorbed in the oscillator but guided in the outer clad to amplify seed wavelength and mode-field-adaptor may be used to match the single mode beam in the TOP-booster fiber and the final power amplifier. Some embodiments may use a cladding light stripper (CLS) to strip off the residual 976 nm pump before the output endcap.

FIG. 4 illustrates a refractive index 400 of a fiber that is similar to the fiber 375 of FIG. 3C and includes a dual core triple fiber clad. In this example, the values 476-479 are, respectively, 660-880 µm, 600-800 µm/0.022 NA or higher, ~35 µm (Yb-1200 doped annulus/0.05 NA), ~10 µm (Yb-700 doped/0.065 NA).

In view of the many possible embodiments to which the principles of the disclosed technology may be applied, it should be recognized that the illustrated embodiments are only preferred examples and should not be taken as limiting the scope of the disclosure. I claim as my invention all that comes within the scope and spirit of the appended claims.

The invention claimed is:

1. An apparatus including a seed laser, the apparatus comprising:
   a plural core fiber including a first core and a second core, the second core surrounding the first core, wherein the seed laser is optically coupled to the first core;
   the plural core fiber including a first section to operate as an oscillator and a second different section to operate as a power amplifier; and
   one or more diode pumps optically coupled to the first section of the plural core fiber;
   wherein a dopant of the second core provides a higher absorption coefficient at a selected wavelength than a dopant of the first core.

2. The apparatus of claim 1, wherein a selected wavelength associated with the oscillator is less than a center wavelength of the seed laser.

3. The apparatus of claim 2, wherein a difference between the selected wavelength associated with the oscillator and the center wavelength is in a range of 0.1-8%.

4. The apparatus of claim 2, wherein the center wavelength of the seed laser is in a range of 1020-1080 nm.

5. The apparatus of claim 2, wherein the selected wavelength associated with the oscillator is 1018 nm.

6. The apparatus of claim 1, wherein the second core has an NA (numerical aperture) that is greater or equal to an NA of the first core.

7. The apparatus of claim 1, wherein the oscillator comprises a multimode oscillator.

8. The apparatus of claim 1, wherein the second core has a same axis as the first core.

9. The apparatus of claim 1, wherein the one or more diode pumps are coupled to an (N+1)×1 combiner that is coupled to an end of the first section of the plural core fiber.

10. An apparatus including a seed laser, the apparatus comprising:
    a plural core fiber including a first core and a second core, the second core surrounding the first core, wherein the seed laser is optically coupled to the first core;
    the plural core fiber including a first section to operate as an oscillator and a second different section to operate as a power amplifier;
    plural diode pumps optically coupled to the first section of the plural core fiber; and
    a combiner optically coupled between the plural diode pumps and the first section of the plural core fiber.

11. The apparatus of claim 10, wherein the second core is doped differently than the first core.

12. The apparatus of claim 10, wherein a quantity of diode pumps of the plural diode pumps comprises a value N, and wherein the combiner comprises a (N+1)×1 combiner.

13. The apparatus of claim 1, wherein the seed laser comprises a diode laser.

14. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein the seed laser comprises a preamplifier to generate greater than 20 W of seed power.

15. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein the seed laser is a pseudo random bit sequence (PRBS) phase-modulated.

16. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein the first and second cores are doped with different rare earth dopants.

17. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein the first section includes a highly reflective fiber Bragg grating (HR-FBG) associated with the oscillator and partially reflecting fiber Bragg grating (PR-FBG) associated with a booster amplifier.

18. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein the plural core fiber comprises a dual core triple clad fiber.

19. The apparatus of claim 18, wherein the second core is doped differently than the first core.

20. An apparatus including a seed laser, the apparatus comprising:
- a plural core fiber including a first core and a second core, the second core surrounding the first core, wherein the seed laser is optically coupled to the first core;
- the plural core fiber including a first section to operate as an oscillator and a second different section to operate as a power amplifier; and
- one or more diode pumps optically coupled to the first section of the plural core fiber;
- wherein a dopant of the first core comprises a first dopant concentration and a dopant of the second core comprises a second dopant concentration that is greater than the first concentration.

* * * * *